US007009426B2

(12) United States Patent
Dosho et al.

(10) Patent No.: US 7,009,426 B2
(45) Date of Patent: Mar. 7, 2006

(54) DATA TRANSMISSION/RECEPTION SYSTEM

(75) Inventors: Shiro Dosho, Ikeda (JP); Yusuke Tokunaga, Ibaraki (JP); Yasuyuki Doi, Nagaokakyo (JP); Hirofumi Nakagawa, Kyoto (JP); Yoshito Date, Otsu (JP); Tetsuro Ohmori, Hirakata (JP); Kaori Nishikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/513,965

(22) PCT Filed: Aug. 27, 2003

(86) PCT No.: PCT/JP03/10884

§ 371 (c)(1),
(2), (4) Date: Nov. 10, 2004

(87) PCT Pub. No.: WO2004/021656

PCT Pub. Date: Mar. 11, 2004

(65) Prior Publication Data

US 2005/0174145 A1 Aug. 11, 2005

(30) Foreign Application Priority Data

Aug. 28, 2002 (JP) ............................ 2002-248086

(51) Int. Cl.
*H03K 19/00* (2006.01)

(52) U.S. Cl. ........................... 326/93; 326/86; 326/90; 326/82

(58) Field of Classification Search ........... 326/82–83, 326/86, 90, 93, 95
See application file for complete search history.

(56) References Cited

U.S. PATENT DOCUMENTS

| | | | |
|---|---|---|---|
| 5,418,478 A | 5/1995 | Van Brunt et al. | |
| 5,694,060 A | 12/1997 | Brunt et al. | |
| 6,452,421 B1 * | 9/2002 | Saito | 326/93 |
| 6,775,328 B1 * | 8/2004 | Segaram | 375/257 |

FOREIGN PATENT DOCUMENTS

| | | |
|---|---|---|
| JP | 11-194748 A | 7/1999 |
| JP | 2002-94489 A | 3/2002 |
| JP | 2002-101076 A | 4/2002 |

* cited by examiner

*Primary Examiner*—Anh Q. Tran
(74) *Attorney, Agent, or Firm*—McDermott Will & Emery LLP

(57) ABSTRACT

In the process of transferring a clock signal and a plurality of data signals which are in synchronization with the clock signal, a driving pulse width of a driver switch is feedback-controlled by a clock transmission system (12), whereby the clock signal is transmitted at a small amplitude. A control signal having the pulse width is used for controlling the driver switch in each data transmission system (13), whereby transfer of each data signal at a small amplitude is realized at the same time. Further, in a clock reception system (10), the control signal having the pulse width is used in delay control of a clock delay circuit, whereby an optimum latch timing of received data in each data reception system (11) is realized.

8 Claims, 11 Drawing Sheets

DATA TRANSMISSION/RECEPTION SYSTEM

This application is a 371 of PCT/JP03/10884 filed on Aug. 27, 2003.

TECHNICAL FIELD

The present invention relates to a data transmission/reception system for transferring a clock signal and a plurality of data signals which are in synchronization with the clock signal.

BACKGROUND ART

U.S. Pat. Nos. 5,418,478 and 5,694,060 disclose a CMOS (Complementary Metal Oxide Semiconductor) differential driver for driving a twisted-pair cable at a small amplitude.

In a liquid crystal display disclosed in Japanese Unexamined Patent Publication No. 11-194748, a plurality of data driver chips are aligned along a side of a liquid crystal panel, and a clock line and a plurality of data lines are provided between adjacent chips. Each of the data drivers receives a single clock input and a plurality of data inputs. Each data driver supplies a predetermined data voltage to the liquid crystal panel and, in the meantime, supplies a clock output and a plurality of data outputs to an adjacent data driver.

DISCLOSURE OF INVENTION

In a data driver for a liquid crystal display, transmission and reception of data at a small amplitude are required for the purpose of achieving a higher speed and reducing EMI (Electro-Magnetic interference). However, the aforementioned CMOS differential driver technique cannot be employed because restrictions on the chip size of the data driver have become tougher along with a decrease in the frame area of the liquid crystal display.

An objective of the present invention is to achieve clock transfer and data transfer at a small amplitude with a small-scale circuit structure.

In order to achieve this objective, according to the present invention, at the time of data transmission, the amplitude of a clock signal is first controlled, and then, the amplitude of a data signal is controlled using a control signal of the clock amplitude control.

Further, the output amplitude is controlled by controlling the width of a switch driving pulse. With this feature, the output amplitude can be controlled over a wide supply voltage range while low power consumption is realized.

Furthermore, the output amplitude is controlled by controlling the ON period of a switch, and the ON period is used in a reception system for receiving a clock and data. With this feature, precise data reception is achieved.

BEST MODE FOR CARRYING OUT THE INVENTION

Hereinafter, an embodiment of the present invention is described in detail with reference to the attached drawings.

Figure 1:
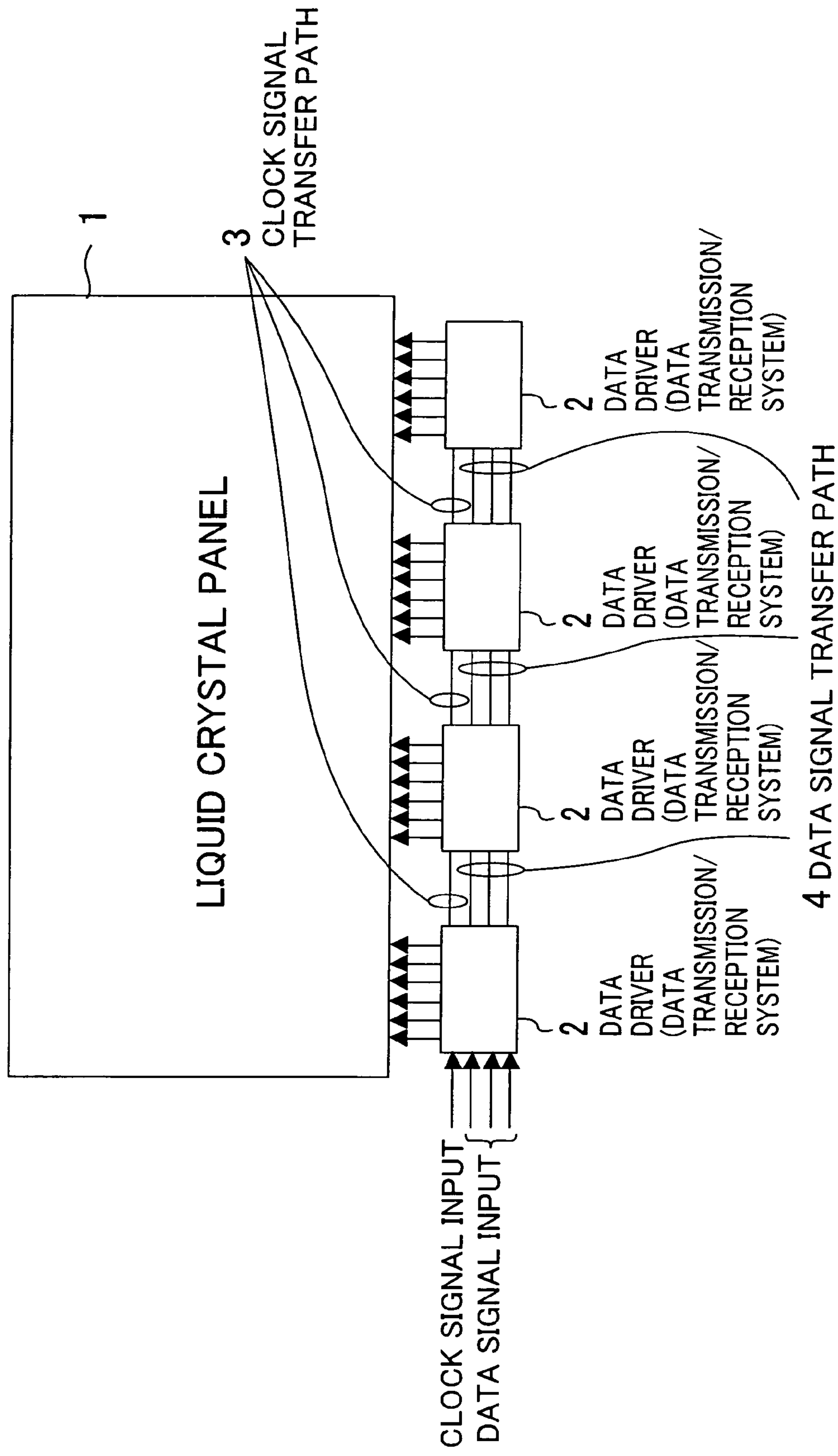
FIG. 1 is a block diagram showing an example where a data transmission/reception system of the present invention is used in data drivers of a liquid crystal panel.

FIG. 1 shows an example where a data transmission/reception system of the present invention is used in data drivers of a liquid crystal panel. In FIG. 1, reference numeral 1 denotes a liquid crystal panel; reference numeral 2 denotes a plurality of cascade-connected data drivers (data transmission/reception systems); reference numeral 3 denotes a clock signal transfer path; and reference numeral 4 denotes a data signal transfer path.

Figure 2:
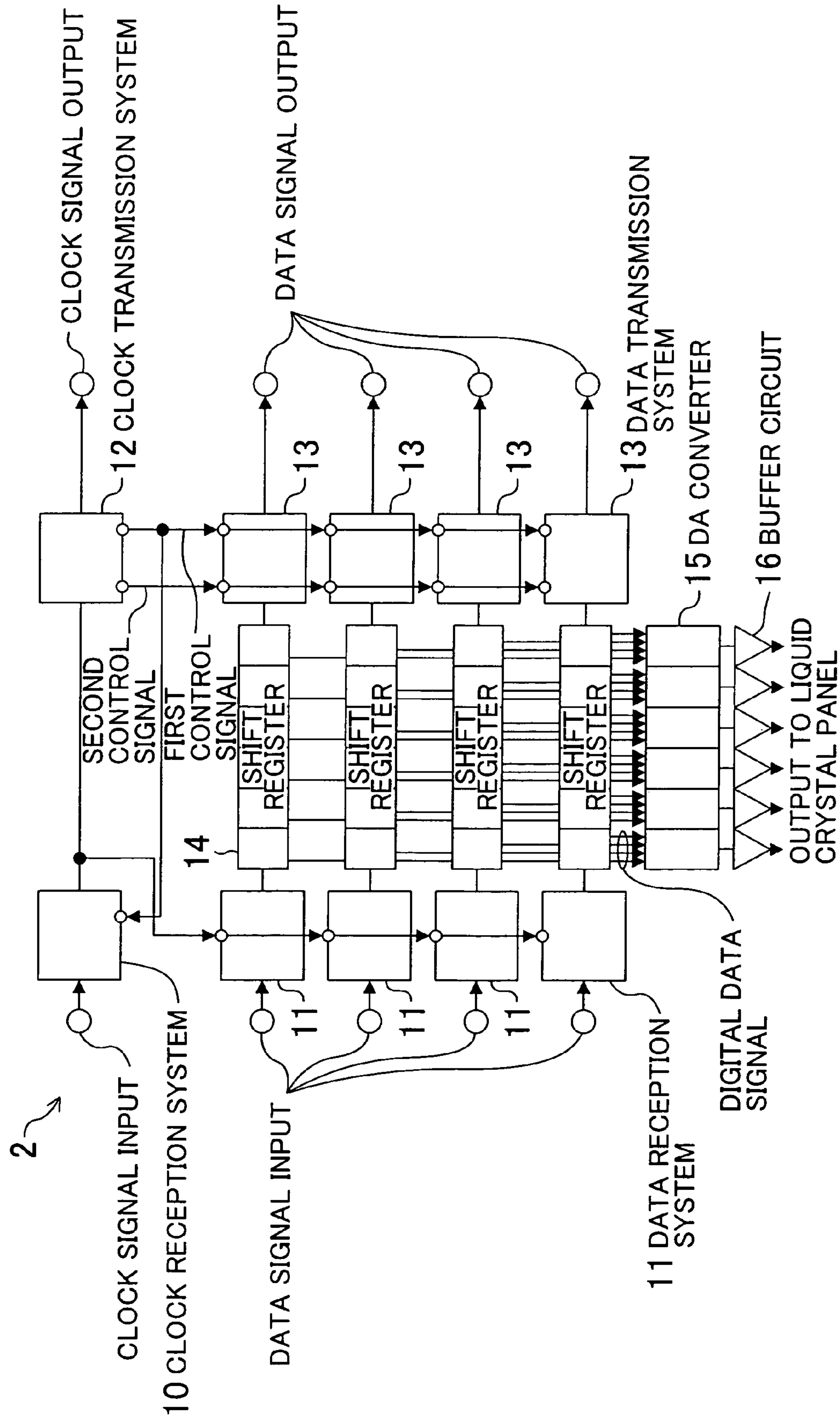
FIG. 2 is a block diagram showing an example of an internal structure of each data driver of FIG. 1.

FIG. 2 shows an example of an internal structure of each data driver 2 of FIG. 1. The data driver 2 of FIG. 2 includes: a clock reception system 10 for receiving a clock signal; a plurality of data reception systems 11 for receiving corresponding data signals; a clock transmission system 12 for transmitting the clock signal, which has been supplied from the clock reception system 10, to the clock signal transfer path 3 at a small amplitude; a plurality of data transmission systems 13 for transmitting the data signals, which have been supplied from the data reception systems 11 through corresponding shift registers 14, to the data signal transfer path 4 at a small amplitude; a DA (Digital-to-Analog) converter 15 for converting digital data signals obtained from all of the shift registers 14 to analog signals; and a buffer circuit 16 for receiving the analog signals and supplying required data voltages to the liquid crystal panel 1. The clock transmission system 12 and the plurality of data transmission systems 13 are respectively connected to first power supply Vdd (e.g., 2 V) and second power supply Vss (e.g., 0 V) for operation.

Figure 3:
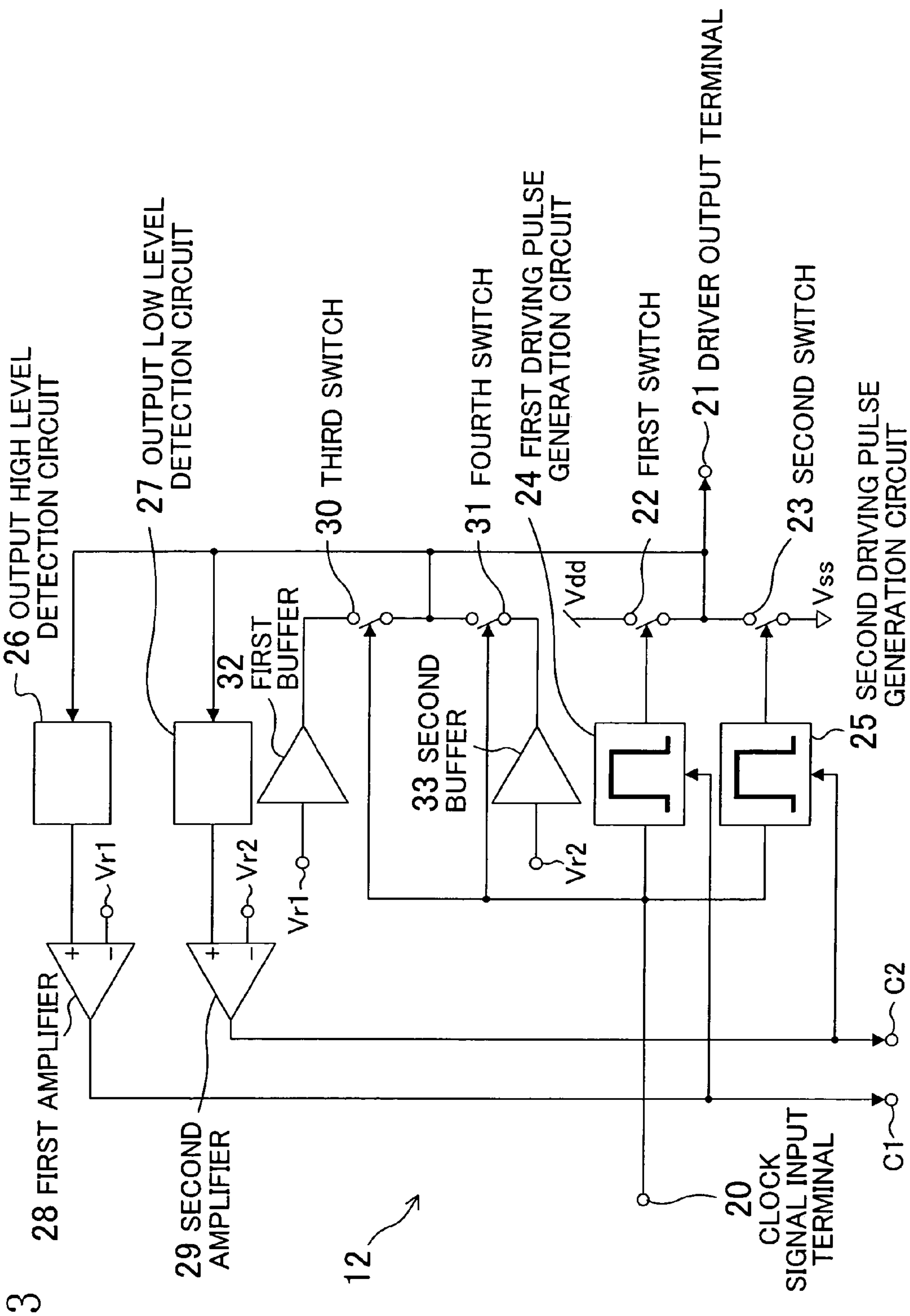
FIG. 3 is a block diagram showing an example of a detailed structure of a clock transmission system of FIG. 2.

FIG. 3 shows an example of a detailed structure of a clock transmission system 12 of FIG. 2. In FIG. 3, reference numeral 20 denotes a clock signal input terminal, and reference numeral 21 denotes a driver output terminal which is connected to the clock signal transfer path 3.

The clock transmission system 12 of FIG. 3 includes: a first switch 22 interposed between first power supply Vdd and the driver output terminal 21; a second switch 23 interposed between the driver output terminal 21 and second power supply Vss; a first driving pulse generation circuit 24 for generating a pulse which drives the first switch 22 according to a clock signal supplied from the clock signal input terminal 20; a second driving pulse generation circuit 25 for generating a pulse which drives the second switch 23 according to the clock signal supplied from the clock signal input terminal 20; a third switch 30 which is turned on when a high level voltage is output to the driver output terminal 21 and is turned off when a low level voltage is output to the driver output terminal 21 according to the clock signal supplied from the clock signal input terminal 20; a fourth switch 31 which is turned off when a high level voltage is output to the driver output terminal 21 and is turned on when a low level voltage is output to the driver output terminal 21 according to the clock signal supplied from the clock signal input terminal 20; a first buffer 32 for supplying first reference voltage Vr1 (e.g., 1.5 V) to the driver output terminal 21 through the third switch 30; and a second buffer 33 for supplying second reference voltage Vr2 (e.g., 0.5 V) to the driver output terminal 21 through the fourth switch 31. These elements constitute a clock driver circuit for driving the clock signal transfer path 3 according to the clock signal supplied from the clock reception system 10 through the clock signal input terminal 20. When both the first switch 22 and the second switch 23 are off, the first buffer 32 and the second buffer 33 hold the high level voltage or low level voltage of the driver output terminal 21.

The clock transmission system 12 of FIG. 3 further includes: an output high level detection circuit 26 for detecting a high level voltage of the driver output terminal 21; an output low level detection circuit 27 for detecting a low level voltage of the driver output terminal 21; a first amplifier 28 for amplifying the different between a high level voltage detected by the output high level detection circuit 26 and first reference voltage Vr1 to output the amplified difference as first control signal C1; and a second amplifier 29 for amplifying the different between a low level voltage detected by the output low level detection circuit 27 and second reference voltage Vr2 to output the amplified difference as second control signal C2. First control signal C1 is fed back to the first driving pulse generation circuit 24, and second control signal C2 is fed back to the second driving pulse generation circuit 25. That is, the first driving pulse generation circuit 24 controls the width of the pulse which drives the first switch 22 based on first control signal C1 such that the high level voltage of the driver output terminal 21 is equal to first reference voltage Vr1. The second driving pulse generation circuit 25 controls the width of the pulse which drives the second switch 23 based on second control signal C2 such that the low level voltage of the driver output terminal 21 is equal to second reference voltage Vr2.

When the voltage at the clock signal input terminal 20 rises to the high level, the first driving pulse generation circuit 24 operates to turn on the first switch 22 for a time period designated by first control signal C1, so that the voltage level at the driver output terminal 21 increases. Conversely, when the voltage at the clock signal input terminal 20 falls to the low level, the second driving pulse generation circuit 25 operates to turn on the second switch 23 for a time period designated by second control signal C2, so that the voltage level at the driver output terminal 21 decreases. In this way, the feed back circuit, which is formed by the output high level detection circuit 26 and the output low level detection circuit 27 and the first amplifier 28 and the second amplifier 29, controls the high level voltage of the clock signal transmitted to the clock signal transfer path 3 to be equal to first reference voltage Vr1 which is lower than the voltage of first power supply Vdd and the low level voltage of the clock signal transmitted to the clock signal transfer path 3 to be equal to second reference voltage Vr2 which is higher than the voltage of second power supply Vss.

The above-described pulse width control method has the advantages of achieving low power consumption and fast speed as in a digital circuit and precisely controlling the output voltage value as in an analog buffer (e.g., voltage follower circuit). Although the first buffer 32 and the second buffer 33 of FIG. 3 are analog buffers, these buffers 32 and 33 are provided only for the purpose of stably retaining the voltage of the driver output terminal 21 but not for the purpose of charging/discharging the load of the driver output terminal 21. Thus, it is possible to decrease the power consumption of the clock transmission system 12 to a very small amount.

Figure 4:
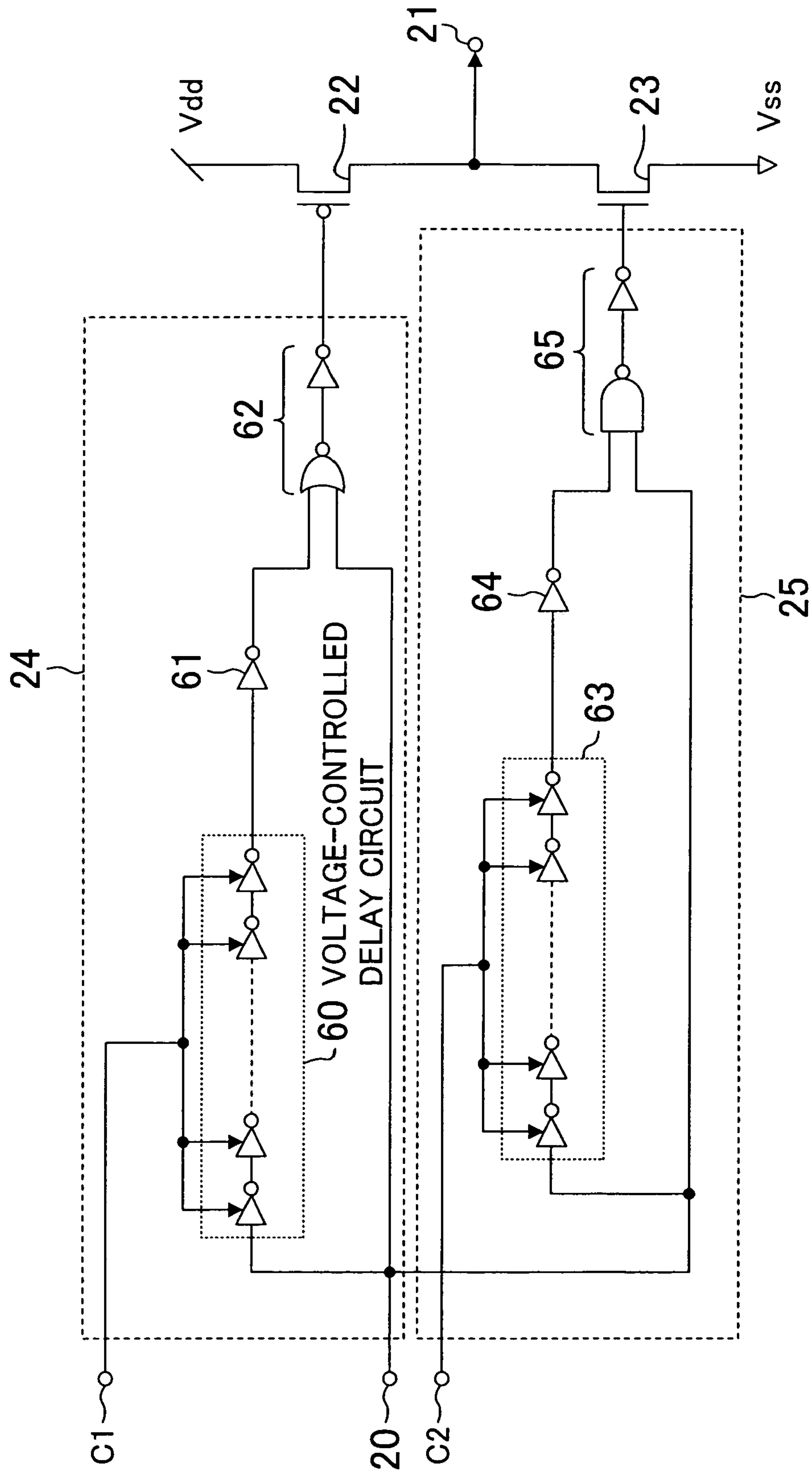
FIG. 4 is a circuit diagram showing an example of a detailed structure of the first and second driving pulse generation circuits of FIG. 3.

FIG. 4 shows an example of a detailed structure of the first and second driving pulse generation circuits 24 and 25 of FIG. 3. Herein, the first switch 22 is formed by a P-channel type MOS transistor, and the second switch 23 is formed by an N-channel type MOS transistor. Referring to FIG. 4, the first driving pulse generation circuit 24 includes a voltage-controlled delay circuit 60, an inversion circuit 61 and a OR circuit 62. The second driving pulse generation circuit 25 includes a voltage-controlled delay circuit 63, an inversion circuit 64 and a AND circuit 65.

Figure 5:
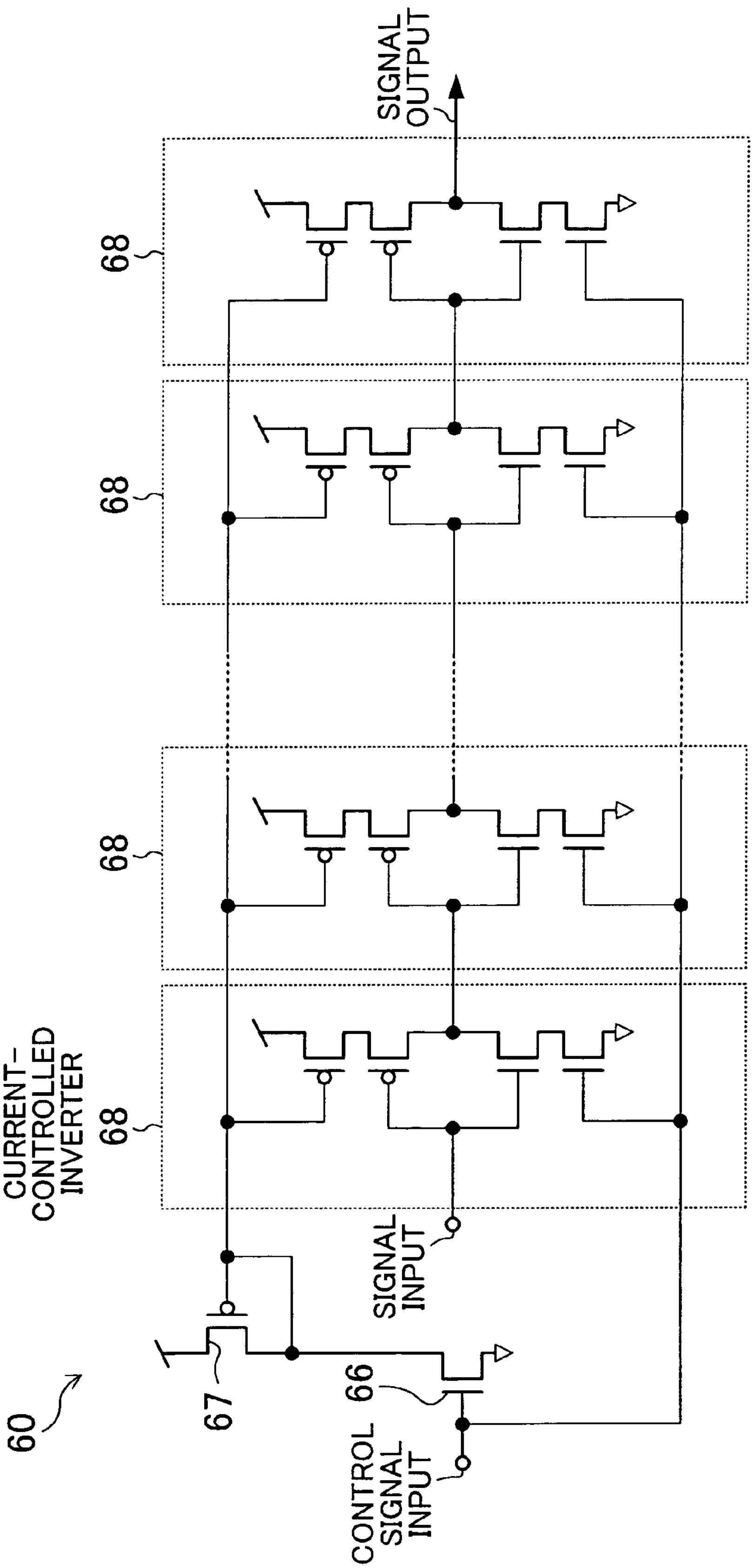
FIG. 5 is a circuit diagram showing an example of a detailed structure of a voltage-controlled delay circuit of FIG. 4.

FIG. 5 shows an example of a detailed structure of the voltage-controlled delay circuit 60 of FIG. 4. Referring to FIG. 5, the voltage-controlled delay circuit 60 includes a pair of a N-channel type MOS transistor 66 and a P-channel type MOS transistor 67 and a plurality of current-controlled inverters 68.

Figure 6:
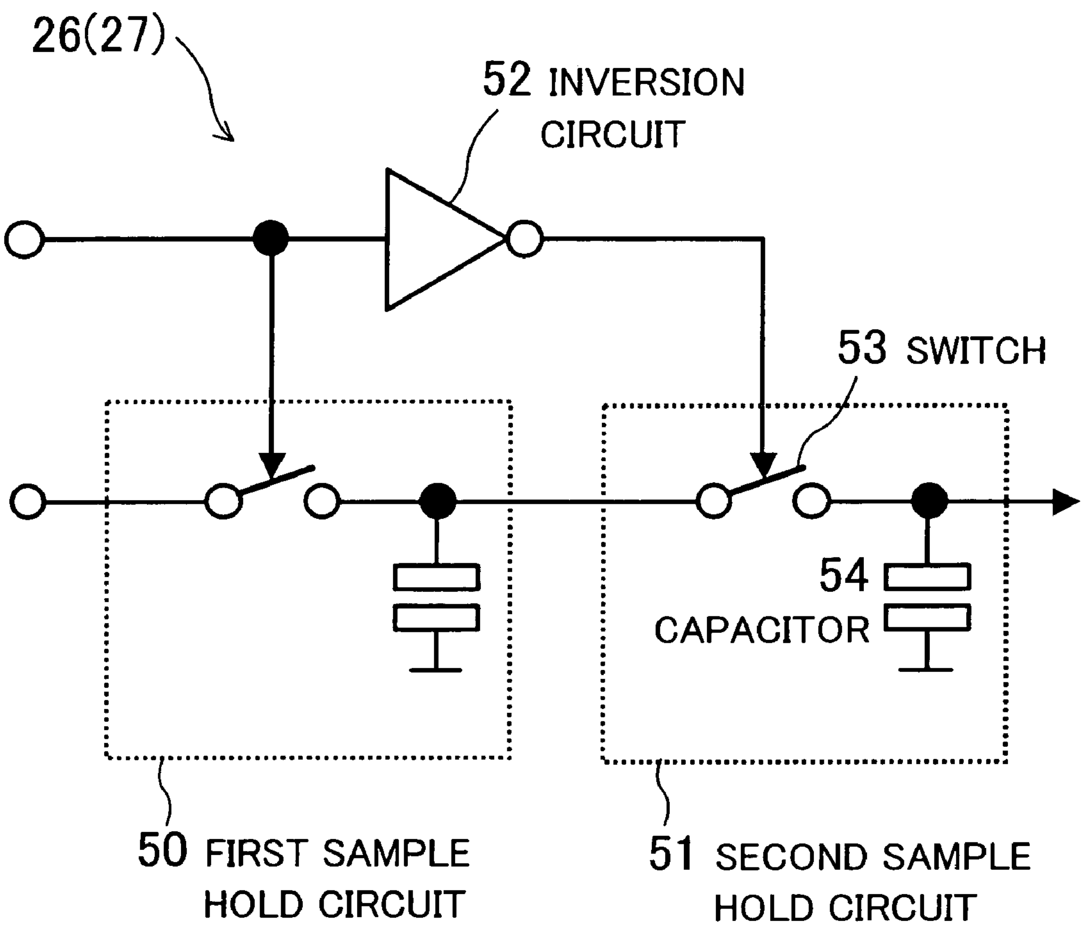
FIG. 6 is a circuit diagram showing an example of a detailed structure of an output high level/low level detection circuit of FIG. 3.

FIG. 6 shows an example of a detailed structure of the output high level (low level) detection circuit 26 (27) of FIG. 3. The output high level (low level) detection circuit 26 (27) is easily formed by connecting a first sample hold circuit 50 and a second sample hold circuit 51 in series. In FIG. 6, reference numeral 52 denotes an inversion circuit, reference numeral 53 denotes a switch, and reference numeral 54 denotes a capacitor. In the case of the output high level detection circuit 26, a driving pulse output from the first driving pulse generation circuit 24 is used to turn on the switch of the first sample hold circuit 50 during the time when the driving pulse is generated, whereby a high level voltage of the driver output terminal 21 is detected. In the case of the output low level detection circuit 27, a driving pulse output from the second driving pulse generation circuit 25 is used to turn on the switch of the first sample hold circuit 50 during the time when the driving pulse is generated, whereby a low level voltage of the driver output terminal 21 is detected.

Figure 7:
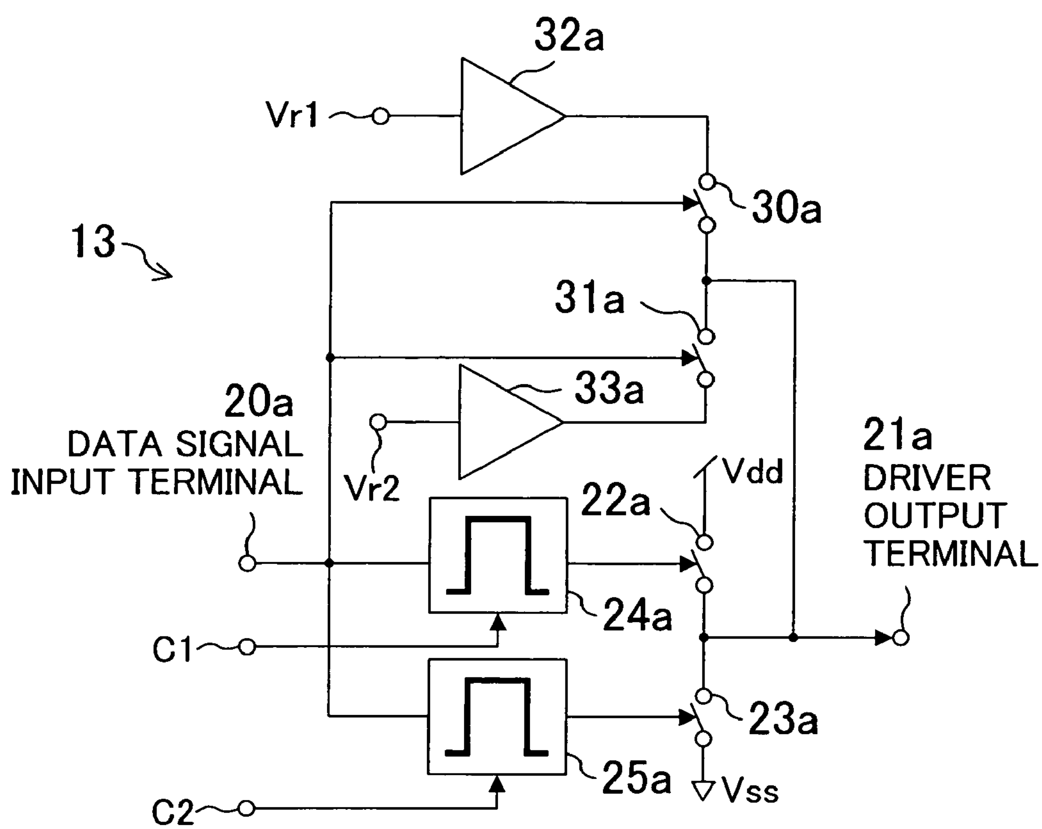
FIG. 7 is a block diagram showing an example of a detailed structure of each data transmission system of FIG. 2.

FIG. 7 shows an example of a detailed structure of each data transmission system 13 of FIG. 2. In FIG. 7, reference numeral 20*a* denotes a data signal input terminal, and reference numeral 21*a* denotes a driver output terminal which is connected to the data signal transfer path 4.

The data transmission system 13 of FIG. 7 includes: a fifth switch 22*a* interposed between first power supply Vdd and the driver output terminal 21*a*; a sixth switch 23*a* interposed between the driver output terminal 21*a* and second power supply Vss; a third driving pulse generation circuit 24*a* for generating a pulse which drives the fifth switch 22*a* according to a data signal supplied from the data signal input terminal 20*a*; a fourth driving pulse generation circuit 25*a* for generating a pulse which drives the sixth switch 23*a* according to a data signal supplied from the data signal input terminal 20*a*; a seventh switch 30*a* which is turned on when a high level voltage is output to the driver output terminal 21*a* and is turned off when a low level voltage is output to the driver output terminal 21*a* according to the data signal supplied from the data signal input terminal 20*a*; an eighth switch 31*a* which is turned off when a high level voltage is output to the driver output terminal 21*a* and is turned on when a low level voltage is output to the driver output terminal 21*a* according to the data signal supplied from the data signal input terminal 20*a*; a third buffer 32*a* for supplying first reference voltage Vr1 to the driver output terminal 21*a* through the seventh switch 30*a*; and a fourth buffer 33*a* for supplying second reference voltage Vr2 to the driver output terminal 21*a* through the eighth switch 31*a*. These elements constitute a data driver circuit for driving the data signal transfer path 4 according to the data signal supplied from the data reception system 11 through the shift register 14 and the data signal input terminal 20*a*. When both the fifth switch 22*a* and the sixth switch 23*a* are off, the third buffer 32*a* and the fourth buffer 33*a* hold the high level voltage or low level voltage of the driver output terminal 21*a*.

The third driving pulse generation circuit 24*a* and the fourth driving pulse generation circuit 25*a* respectively receive first control signal C1 and second control signal C2 which are generated by the clock transmission system 12 of FIG. 3. The third driving pulse generation circuit 24*a* controls the width of the pulse which drives the fifth switch 22*a* based on first control signal C1 such that the high level voltage of the driver output terminal 21*a* is equal to first reference voltage Vr1. The fourth driving pulse generation circuit 25*a* controls the width of the pulse which drives the sixth switch 23*a* based on second control signal C2 such that the low level voltage of the driver output terminal 21*a* is equal to second reference voltage Vr2. That is, although the above-described clock transmission system 12 includes a feedback circuit which is formed by the output high level detection circuit 26 and the output low level detection circuit 27 and the first amplifier 28 and the second amplifier 29, the data transmission system 13 can drive the data signal transfer path 4 at a small amplitude as well as the clock signal transfer path 3 without providing a corresponding feedback circuit to each data transmission system 13.

Figure 8:
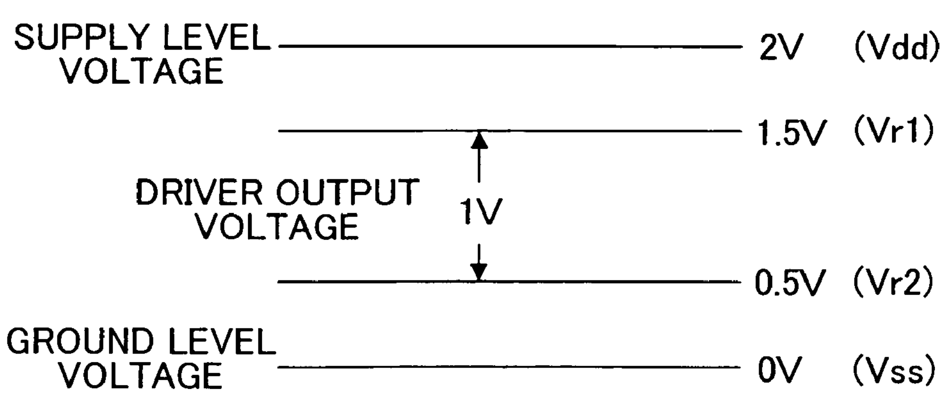
FIG. 8 illustrates the relationship of the driver output voltages and supply voltages in the clock transmission system of FIG. 3 and the data transmission system of FIG. 7.

FIG. 8 illustrates the relationship of the driver output voltages and supply voltages of the clock transmission system 12 of FIG. 3 and the data transmission system 13 of FIG. 7. As seen from FIG. 8, data transmission at a small amplitude of about 1 V is possible even when the voltage of first power supply Vdd is a low voltage of about 2 V. According to the above-described pulse width control, any driver output voltage can be generated in theory. The same applies to a case where the voltage of first power supply Vdd is increased to about 4 V.

Figure 9:
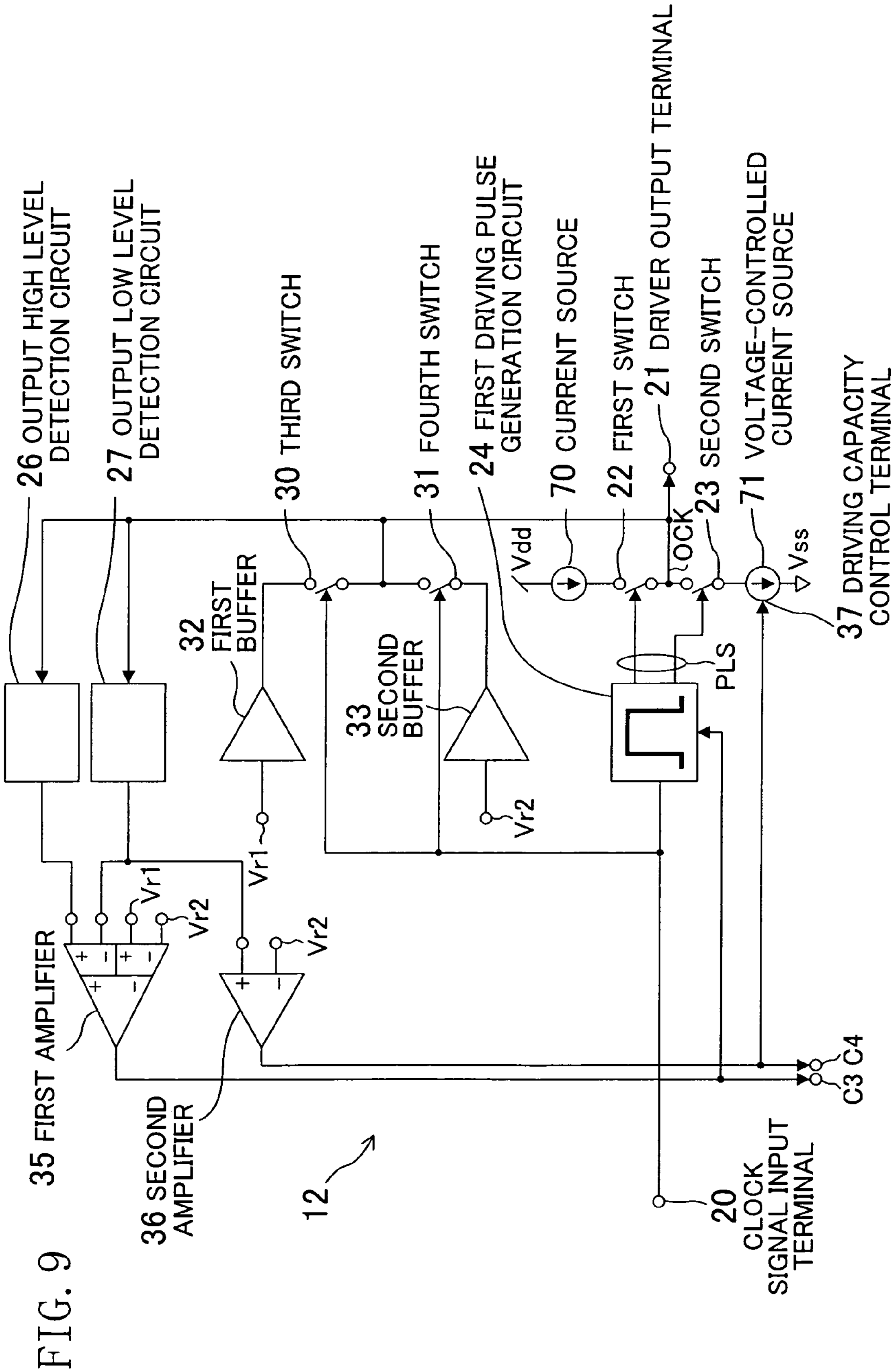
FIG. 9 is a block diagram showing another example of a detailed structure of the clock transmission system of FIG. 2.

FIG. 9 shows another example of a detailed structure of the clock transmission system 12 of FIG. 2. In FIG. 9, the first switch 22 and the second switch 23 are driven by a single (first) driving pulse generation circuit 24. A current source 70 is interposed between first power supply Vdd and the first switch 22, and a voltage-controlled current source 71 is interposed between the second switch 23 and second power supply Vss. A first amplifier 35 amplifies the difference between the amplitude of the clock signal at the driver output terminal 21 which is detected by the output high level detection circuit 26 and the output low level detection circuit 27 and a desired output amplitude (Vr1–Vr2) to output the amplified difference as first control signal C3. A second amplifier 36 amplifies the difference between the low level voltage detected by the output low level detection circuit 27 and second reference voltage Vr2 to output the amplified difference as second control signal C4. The first driving pulse generation circuit 24 controls the widths of the pulses which drive the first switch 22 and the second switch 23 based on first control signal C3 such that the amplitude of the clock signal at the driver output terminal 21 is equal to the desired output amplitude (Vr1–Vr2). Second control signal C4 is supplied to a driving capacity control terminal 37 of the voltage-controlled current source 71, and the driving capacity of the voltage-controlled current source 71 is controlled based on second control signal C4 such that the low level voltage of the driver output terminal 21 is equal to second reference voltage Vr2. The other aspects of this example are the same as those of the structure of FIG. 3. It should be noted that, in FIG. 9, "PLS" denotes a driving pulse generated by the first driving pulse generation circuit 24, and "OCK" denotes an output clock signal.

Figure 10:
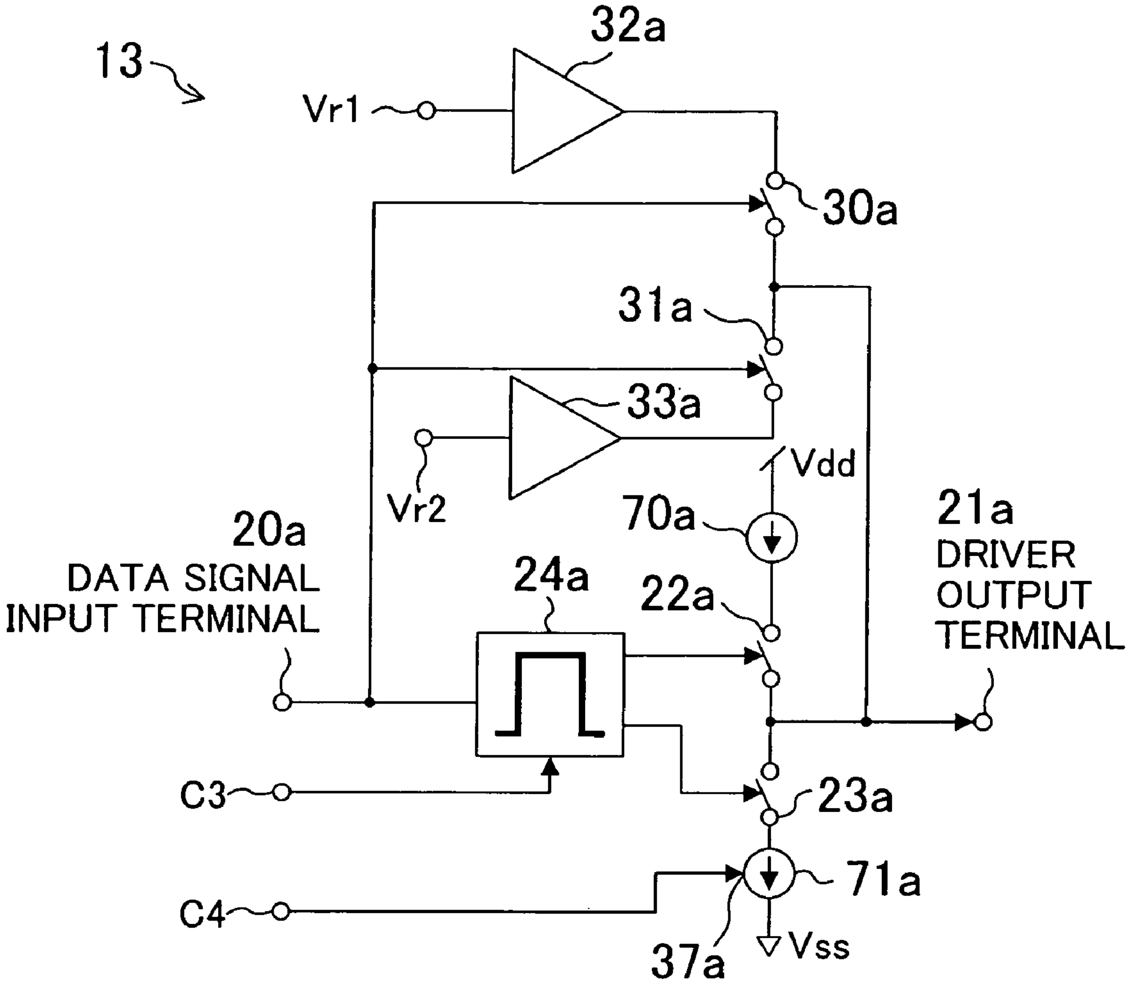
FIG. 10 is a block diagram showing another example of a detailed structure of each data transmission system of FIG. 2.

FIG. 10 shows another example of a detailed structure of each data transmission system 13 of FIG. 2. In FIG. 10, the fifth switch 22*a* and the sixth switch 23*a* are driven by a single (second) driving pulse generation circuit 24*a*. A current source 70*a* is interposed between first power supply Vdd and the fifth switch 22*a*, and a voltage-controlled current source 71*a* is interposed between the sixth switch 23*a* and second power supply Vss. The second driving pulse generation circuit 24*a* and the voltage-controlled current source 71*a* respectively receive first control signal C3 and second control signal C4 which are generated by the clock transmission system 12 of FIG. 9. The second driving pulse generation circuit 24*a* controls the widths of the pulses which drive the fifth switch 22*a* and the sixth switch 23*a* based on first control signal C3 such that the amplitude of the data signal at the driver output terminal 21*a* is equal to the desired output amplitude (Vr1–Vr2). Second control signal C4 is supplied to a driving capacity control terminal 37*a* of the voltage-controlled current source 71*a*, and the driving capacity of the voltage-controlled current source 71*a* is controlled based on second control signal C4 such that the low level voltage of the driver output terminal 21*a* is equal to second reference voltage Vr2. The other aspects of this example are the same as those of the structure of FIG. 7.

In FIG. 9, the voltage level of the driver output terminal 21 can also be determined by the first buffer 32 and the second buffer 33. Thus, the current source 70, the voltage-controlled current source 71 and the second amplifier 36 are omittable. In FIG. 10, the voltage level of the driver output terminal 21*a* can also be determined by the third buffer 32*a* and the fourth buffer 33*a*. Thus, the current source 70*a* and the voltage-controlled current source 71*a* are also omittable.

Figure 11:
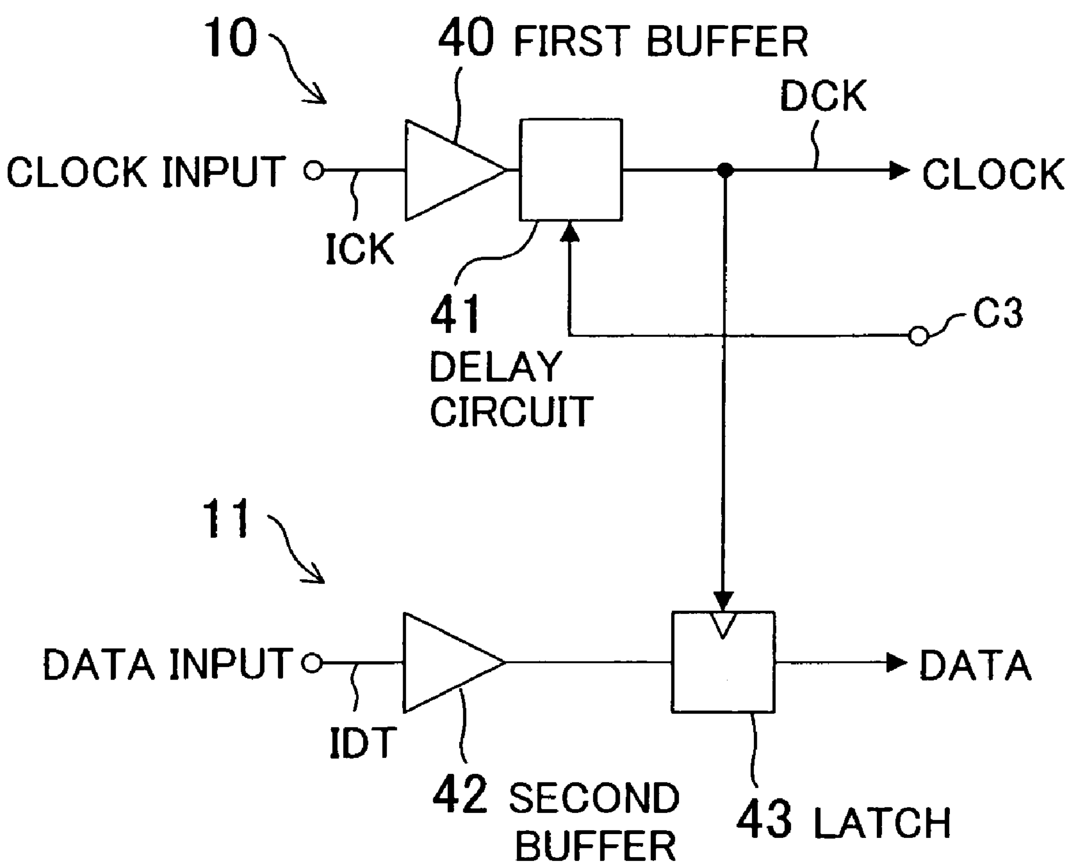
FIG. 11 is a block diagram showing an example of a detailed structure of a clock reception system and each data reception system of FIG. 2.

FIG. 11 shows an example of a detailed structure of the clock reception system 10 and each data reception system 11 of FIG. 2. In FIG. 11, reference numeral 40 denotes a buffer for input clock signal ICK (first buffer); reference numeral 41 denotes a voltage-controlled delay circuit; reference numeral 42 denotes a buffer for input data signal IDT (second buffer); and reference numeral 43 denotes a latch for data. The delay circuit 41 delays input clock signal ICK received by the first buffer 40 by the time period determined according to first control signal C3 supplied from the clock transmission system 12. Signal DCK is the delayed clock signal output from the delay circuit 41. The latch 43 samples input data signal IDT received by the second buffer 42 in synchronization with delayed clock signal DCK.

Figure 12:
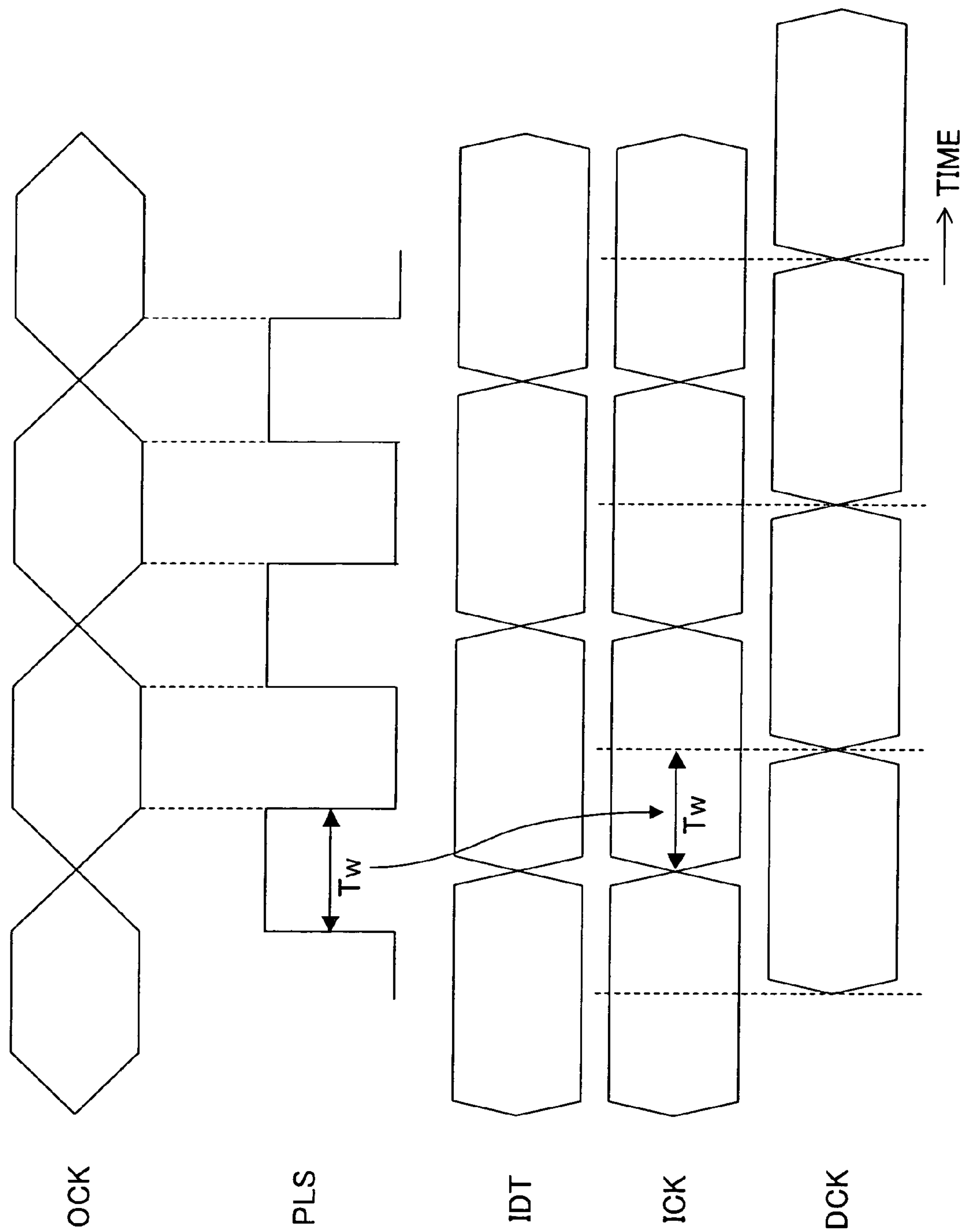
FIG. 12 is a timing chart illustrating an operation of the circuit structure of FIG. 11.

FIG. 12 illustrates the operation of a circuit structure of FIG. 11, where "Tw" is the pulse width of driving pulse PLS generated by the first driving pulse generation circuit 24 of FIG. 9. Assuming that there is no difference in characteristics between the clock signal transfer path 3 and the data signal transfer path 4, input clock signal ICK and input data signal IDT transition at the same timing as shown in FIG. 12 when received by the reception systems 10 and 11, respectively. In this case, latching of input data signal IDT with input clock signal ICK cannot be performed. If input clock signal ICK is delayed by the delay circuit 41 by the time period corresponding to driving pulse width Tw to obtain delayed clock signal DCK, the latch 43 can appropriately latch input data signal IDT in synchronization with a transition of delayed clock signal DCK. Thus, a large scale circuit, such as a PLL (Phase-Locked Loop) circuit, or the like, is not necessary.

INDUSTRIAL APPLICABILITY

As described hereinabove, in a data transmission/reception system of the present invention, clock transfer and data transfer at a small amplitude is realized with a small-scale circuit structure. Thus, the data transmission/reception system of the present invention is useful for a data driver of a liquid crystal display, and the like.

The invention claimed is:

1. A data transmission/reception system for transferring a clock signal and a plurality of data signals which are in synchronization with the clock signal, comprising:

- a clock reception system for receiving the clock signal;
- a plurality of data reception systems for receiving corresponding data signals among the plurality of data signals;
- a clock transmission system for transmitting the clock signal supplied from the clock reception system to a clock signal transfer path at a small amplitude; and
- a plurality of data transmission systems for transmitting the data signals supplied from corresponding data reception systems among the plurality of data reception systems to a data signal transfer path at a small amplitude,
- wherein the clock transmission system and the plurality of data transmission systems are respectively connected to a first power supply and a second power supply for operations,
- the clock transmission system includes
  - a clock driver circuit for driving the clock signal transfer path according to the clock signal supplied from the clock reception system, and
  - a feedback circuit for determining a high level voltage and a low level voltage of the clock signal transfer path to generate at least one control signal which is to be supplied to the clock driver circuit such that a high level voltage of the clock signal which is transmitted to the clock signal transfer path is equal to a first reference voltage which is lower than a voltage of the first power supply, and a low level voltage of the clock signal which is transmitted to the clock signal transfer path is equal to a second reference voltage which is higher than a voltage of the second power supply, and
- each data transmission system includes a data driver circuit for driving the data signal transfer path according to a data signal supplied from a corresponding data reception system among the plurality of data reception systems while amplitude control is performed on the data signal which is to be transmitted to the data signal transfer path based on a control signal generated by the feedback circuit.

2. The data transmission/reception system of claim 1, wherein:

- the clock driver circuit includes
  - a first switch interposed between the first power supply and the clock signal transfer path,
  - a second switch interposed between the clock signal transfer path and the second power supply,
  - a first driving pulse generation circuit for driving the first switch,
  - a second driving pulse generation circuit for driving the second switch,
  - a third switch which is turned on when a high level voltage is output to the clock signal transfer path and which is turned off when a low level voltage is output to the clock signal transfer path,
  - a fourth switch which is turned off when a high level voltage is output to the clock signal transfer path and which is turned on when a low level voltage is output to the clock signal transfer path,
  - a first buffer for supplying the first reference voltage to the clock signal transfer path through the third switch, and
  - a second buffer for supplying the second reference voltage to the clock signal transfer path through the fourth switch,
- the feedback circuit includes
  - a detection circuit for detecting the high level voltage and the low level voltage of the clock signal transfer path, and
  - first and second amplifiers for amplifying differences between a high level voltage and a low level voltage detected by the detection circuit and the first and second reference voltages, respectively, to output the amplified differences as first and second control signals,
- the first driving pulse generation circuit controls the width of a pulse which drives the first switch based on the first control signal such that the high level voltage of the clock signal transfer path is equal to the first reference voltage, and
- the second driving pulse generation circuit controls the width of a pulse which drives the second switch based on the second control signal such that the low level voltage of the clock signal transfer path is equal to the second reference voltage.

3. The data transmission/reception system of claim 2, wherein:

- each of the data driver circuits includes
  - a fifth switch interposed between the first power supply and the data signal transfer path,
  - a sixth switch interposed between the data signal transfer path and the second power supply,
  - a third driving pulse generation circuit for driving the fifth switch,
  - a fourth driving pulse generation circuit for driving the sixth switch,
  - a seventh switch which is turned on when a high level voltage is output to the data signal transfer path and which is turned off when a low level voltage is output to the data signal transfer path,
  - an eighth switch which is turned off when a high level voltage is output to the data signal transfer path and which is turned on when a low level voltage is output to the data signal transfer path,
  - a third buffer for supplying the first reference voltage to the data signal transfer path through the seventh switch, and a fourth buffer for supplying the second reference voltage to the data signal transfer path through the eighth switch, the third driving pulse generation circuit controls the width of a pulse which drives the fifth switch based on the first control signal such that the high level voltage of the data signal transfer path is equal to the first reference voltage, and the fourth driving pulse generation circuit controls the width of a pulse which drives the sixth switch based on the second control signal such that the low level voltage of the data signal transfer path is equal to the second reference voltage.

4. The data transmission/reception system of claim 1, wherein:

the clock driver circuit includes a first switch interposed between the first power supply and the clock signal transfer path, a second switch interposed between the clock signal transfer path and the second power supply, a first driving pulse generation circuit for driving the first switch and the second switch, a third switch which is turned on when a high level voltage is output to the clock signal transfer path and which is turned off when a low level voltage is output to the clock signal transfer path, a fourth switch which is turned off when a high level voltage is output to the clock signal transfer path and which is turned on when a low level voltage is output to the clock signal transfer path, a first buffer for supplying the first reference voltage to the clock signal transfer path through the third switch, and a second buffer for supplying the second reference voltage to the clock signal transfer path through the fourth switch, the feedback circuit includes a circuit for detecting the amplitude of a clock signal on the clock signal transfer path, and a first amplifier for amplifying the difference between the detected amplitude and a desired output amplitude to output the amplified difference as a first control signal, and the first driving pulse generation circuit controls the width of a pulse which drives the first and second switches based on the first control signal such that the amplitude of the clock signal on the clock signal transfer path is equal to the desired output amplitude.

5. The data transmission/reception system of claim 4, wherein:

each of the data driver circuits includes a fifth switch interposed between the first power supply and the data signal transfer path, a sixth switch interposed between the data signal transfer path and the second power supply, a second driving pulse generation circuit for driving the fifth switch and the sixth switch, a seventh switch which is turned on when a high level voltage is output to the data signal transfer path and which is turned off when a low level voltage is output to the data signal transfer path, an eighth switch which is turned off when the high level voltage is output to the data signal transfer path and which is turned on when the low level voltage is output to the data signal transfer path, a third buffer for supplying the first reference voltage to the data signal transfer path through the seventh switch, and a fourth buffer for supplying the second reference voltage to the data signal transfer path through the eighth switch, and the second driving pulse generation circuit controls the width of a pulse which drives the fifth switch and the sixth switch based on the first control signal such that the amplitude of the data signal on the data signal transfer path is equal to the desired output amplitude.

6. The data transmission/reception system of claim 4, wherein:

the feedback circuit further includes a second amplifier for amplifying the difference between a low level voltage of the clock signal transfer path and the second reference voltage to output the amplified difference as a second control signal;

the clock driver circuit further includes a first voltage-controlled current source interposed between the second switch and the second power supply; and the driving capacity of the first voltage-controlled current source is controlled based on the second control signal such that the low level voltage of the clock signal transfer path is equal to the second reference voltage.

7. The data transmission/reception system of claim 6, wherein:

each of the data driver circuits includes a fifth switch interposed between the first power supply and the data signal transfer path, a sixth switch and a second voltage-controlled current source which are interposed in series between the data signal transfer path and the second power supply, a second driving pulse generation circuit for driving the fifth switch and the sixth switch, a seventh switch which is turned on when a high level voltage is output to the data signal transfer path and which is turned off when a low level voltage is output to the data signal transfer path, an eighth switch which is turned off when a high level voltage is output to the data signal transfer path and which is turned on when a low level voltage is output to the data signal transfer path, a third buffer for supplying the first reference voltage to the data signal transfer path through the seventh switch, and a fourth buffer for supplying the second reference voltage to the data signal transfer path through the eighth switch, the second driving pulse generation circuit controls the width of a pulse which drives the fifth switch and the sixth switch based on the first control signal such that the amplitude of the data signal on the data signal transfer path is equal to the desired output amplitude; and the driving capacity of the second voltage-controlled current source is controlled based on the second control signal such that the low level voltage of the data signal transfer path is equal to the second reference voltage.

8. The data transmission/reception system of claim 4, wherein:

the clock reception system includes a delay circuit for delaying the received clock signal by a time period determined according to the first control signal generated by the feedback circuit; and each of the plurality of data reception systems includes a latch for sampling the received data signal in synchronization with a delayed clock signal output from the delay circuit.

* * * * *